(12) United States Patent
Chesson et al.

(10) Patent No.: US 6,223,270 B1
(45) Date of Patent: Apr. 24, 2001

(54) METHOD FOR EFFICIENT TRANSLATION OF MEMORY ADDRESSES IN COMPUTER SYSTEMS

(75) Inventors: Gregory L. Chesson, Palo Alto; James T. Pinkerton, Sunnyvale, both of CA (US); Eric Salo, Apple Valley, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/294,830

(22) Filed: Apr. 19, 1999

(51) Int. Cl.[7] ................................... G06F 12/02
(52) U.S. Cl. ........................... 711/202; 711/203
(58) Field of Search .................... 711/202, 203

(56) References Cited

U.S. PATENT DOCUMENTS

| | | | |
|---|---|---|---|
| 5,530,820 | * 6/1996 | Onodera | 709/1 |
| 5,900,004 | * 5/1999 | Gipson | 707/530 |
| 5,933,857 | * 8/1999 | Brewer et al. | 711/202 |
| 5,956,755 | * 9/1999 | Kanie et al. | 711/206 |

* cited by examiner

*Primary Examiner*—Hiep T. Nguyen
(74) *Attorney, Agent, or Firm*—Wagner, Murabito & Hao LLP

(57) ABSTRACT

A method and system for efficient translation of memory addresses in computer systems. The present invention enables address translations between different address spaces to be performed without using the table lookup step typically required in the prior art. Thus, the present invention provides significant improvements in both time and space efficiency over prior art implementations of address translation. In modern computer systems where direct memory access (DMA) operations are used extensively, especially in the emerging field of operating system (OS) bypass technology, the performance improvements afforded by the present invention are particularly critical to the realization of an efficient and high performance system. A method and system for efficiently translating memory addresses in computer systems and the address representation used are described herein.

33 Claims, 8 Drawing Sheets

METHOD FOR EFFICIENT TRANSLATION OF MEMORY ADDRESSES IN COMPUTER SYSTEMS

BACKGROUND OF THE INVENTION

1. Field of the Invention

The present invention relates to the field of memory management in computer systems. More specifically, the present invention relates to the optimization of memory address translation.

2. Related Art

Memory management is an important facet in the operation of modern computer systems. In particular, efficient memory management is a crucial factor to high performance in today's computer systems. Accordingly, much effort has been expended towards improving the efficiency of memory management, especially with respect to the efficiency of memory-related operations and representations.

One important instance of memory management involves the translation, or mapping, of a memory address from one address space to another address space. An address space delineates a range of memory addresses which a computer system can access under defined circumstances. Typically, multiple address spaces are used in a modern computing environment. For example, when a virtual address is referenced, it is often necessary to identify the physical address corresponding to the virtual address so that the contents at the physical memory location represented by the virtual address can be accessed. In this case, the virtual address of a virtual address space needs to be translated to the underlying physical address of a physical address space.

Generally, software and hardware systems frequently have to translate one synthetic address to a physical address or to another synthetic address. In this context, a synthetic address is a memory address based on an abstract index and an offset. Synthetic addresses within a given synthetic address space share the same abstract index but each has a different offset. Examples of synthetic addresses include virtual addresses and addresses used for remote direct memory access (remote DMA, or RDMA) operations between different computer systems.

In prior art methods for performing address translation or memory mapping, a table-based lookup is generally a required step. For example, a hash table, a page table, or another kind of table is used to store the relationship between a source address and its target address. Whenever an address translation is triggered by an operation requesting access to a source address representing a target address, a table lookup step has to be performed. This step is performed in order to retrieve the target address that corresponds to the source address so that the memory access request can be serviced. Typically, the table lookup step is required every time an address needs to be translated under the prior art.

However, these prior art methods are inefficient because performing a table lookup is expensive both in terms of computational time and space requirement. Under these prior art methods, every address translation requires a table lookup, thus the time and area requirements increase as the number of translations performed becomes larger. Consequently, these prior art methods are far from ideal in systems implementing DMA, where numerous address translations are routinely performed. The inefficiency inherent in these prior art methods is further aggravated in modern computer systems having multiple hosts and with remote DMA implemented, since even more extensive address translations are typical in such an environment. These prior art methods are therefore not well suited to the implementation of modern high speed computer systems.

Thus, there exists a need for a method and system for performing memory address translations with minimal overhead computations, thereby providing improved efficiency and performance enhancement over the prior art in order to meet the ever-increasing performance demand of modern high performance systems.

SUMMARY OF THE INVENTION

Accordingly, the present invention offers a method and system for efficient performance of memory address translations. The present invention also provides a method and system for efficient representation of a remote address within a local address space. Since the present invention enables address translations to be performed using simple arithmetic computations, the table lookup step in address translation, as is typically required in the prior art, is readily eliminated. The present invention thus provides significant improvements in both time and space efficiency over prior art implementations of address translation. In modern computer systems where direct memory access (DMA) operations are used extensively, especially in the emerging field of operating system (OS) bypass technology, the performance improvements afforded by the present invention are particularly critical to the realization of an efficient and high performance system. A method and system for efficiently translating memory addresses in computer systems and the address representation used are thus described herein. These and other advantages of the present invention not specifically described above will become clear within discussions of the present invention herein.

Specifically, one embodiment of the method of the present invention includes the steps of: reserving a target memory region (TMR) in a target address space, where the TMR has a target base address; reserving a source memory region (SMR) in a source address space, where the SMR has a source base address; generating a descriptor which includes information for resolving the target base address of the TMR; and representing the TMR with the SMR in the source address space, where the source base address is selected based on the descriptor such that the target base address can be computed from the source base address without using a lookup table. In one embodiment, the descriptor includes a virtual address representation of the target base address.

Another embodiment of the method of the present invention includes the above steps and wherein the TMR includes a target address having an offset from the target base address, the SMR includes a source address representing the target address, and the source address encodes the offset of the target address such that the target address can be computed from the source address without using a lookup table.

Yet another embodiment of the method of the present invention includes the above steps and further includes the steps of: receiving a request to access a target address of the TMR while operating in a context of the source address space; and servicing the request to access the target address without using a lookup table.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

In the following detailed description of the present invention, a method and system for efficient performance of memory address translations, numerous specific details are set forth in order to provide a thorough understanding of the present invention. However, it will be clear to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reserving", "generating", "representing", "receiving", "servicing" or the like, refer to the action and processes of a computer system (e.g., FIG. 1A), or similar electronic computing device, that manipulates and transforms data represented as physical (electronic) quantities within the computer system's registers and memories into other data similarly represented as physical quantities within the computer system memories or registers or other such information storage, transmission or display devices. The present invention is also well suited to the use of other computer systems such as, for example, optical and mechanical computers.

Computer System Environment of the Present Invention

Figure 1A:
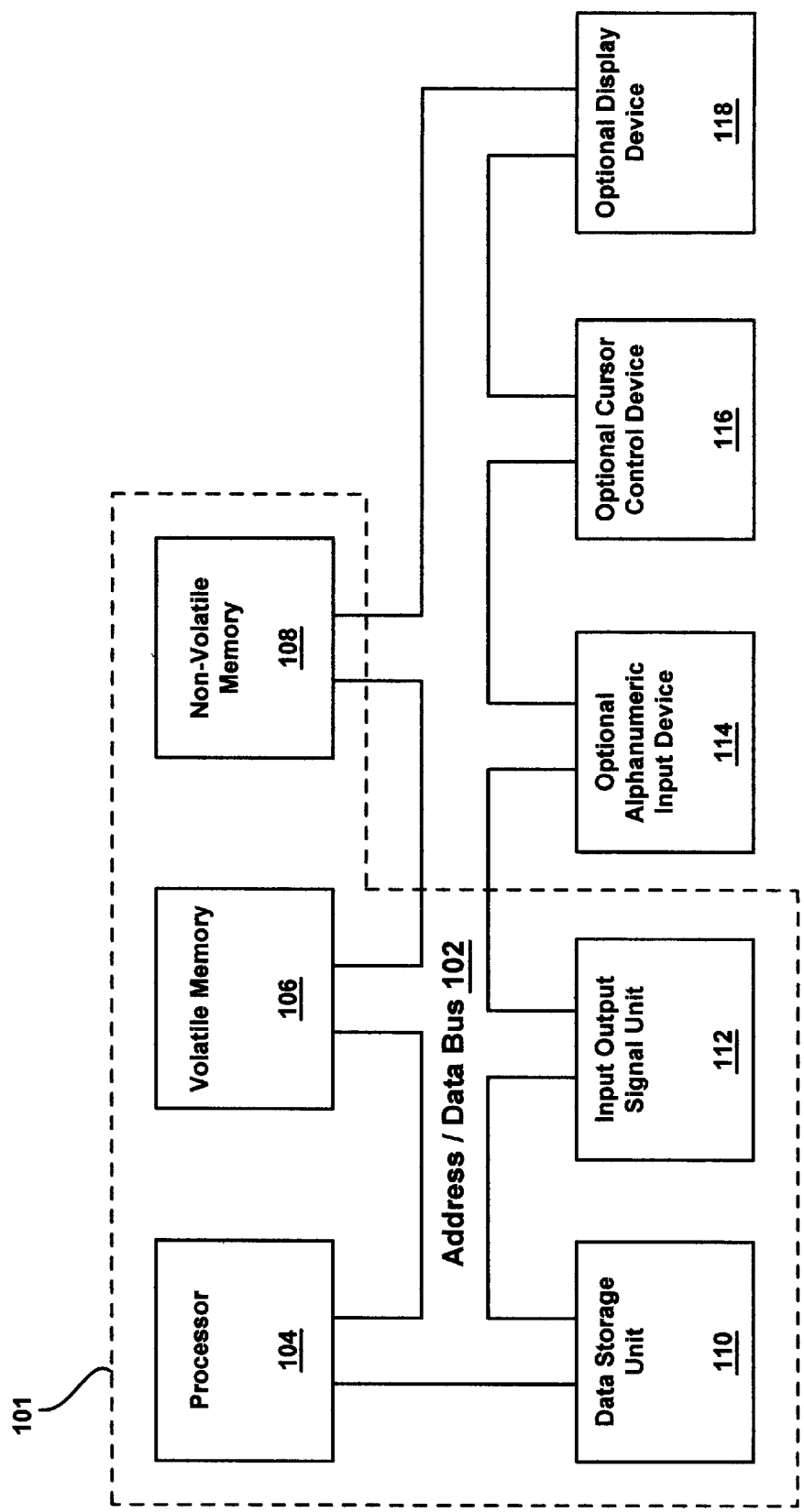
FIG. 1A is a general purpose computer system which provides an operational platform for embodiments of the present invention.

With reference now to FIG. 1A, portions of the present memory address translation method and system are comprised of computer-readable and computer-executable instructions which reside, for example, in computer-usable media of a computer system. FIG. 1A illustrates an exemplary computer system 101 used to perform the memory address translation method in accordance with one embodiment of the present invention. It is appreciated that system 101 of FIG. 1A is exemplary only and that the present invention can operate within a number of different computer systems including general purpose networked computer systems, embedded computer systems, and stand alone computer systems. Additionally, computer system 101 of FIG. 1A is well adapted having computer readable media such as, for example, a floppy disk, a compact disc, and the like coupled thereto. Such computer readable media is not shown coupled to computer system 101 in FIG. 1A for purposes of clarity.

In general, computer system 101 includes an address/data bus 102 for communicating information, a central processor 104 coupled with the bus for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 101 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 101 include 106, 108 and 110. Computer system 101 can also include a signal input output communication device 112 (e.g., modem, network interface card NIC) coupled to the bus 102 for interfacing with other computer systems.

With reference still to FIG. 1A, also included in computer system 101 is an optional alphanumeric input device 114 including alphanumeric and function keys coupled to the bus 102 for communicating information and command selections to the central processor 104. Computer system 101 also includes an optional cursor control or directing device 116 coupled to the bus 102 for communicating user input information and command selections to the central processor 104. An optional display device 118 can also be coupled to the bus 102 for displaying information to the computer user. Display device 118 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

Source and Target Address Spaces

Figure 1B:
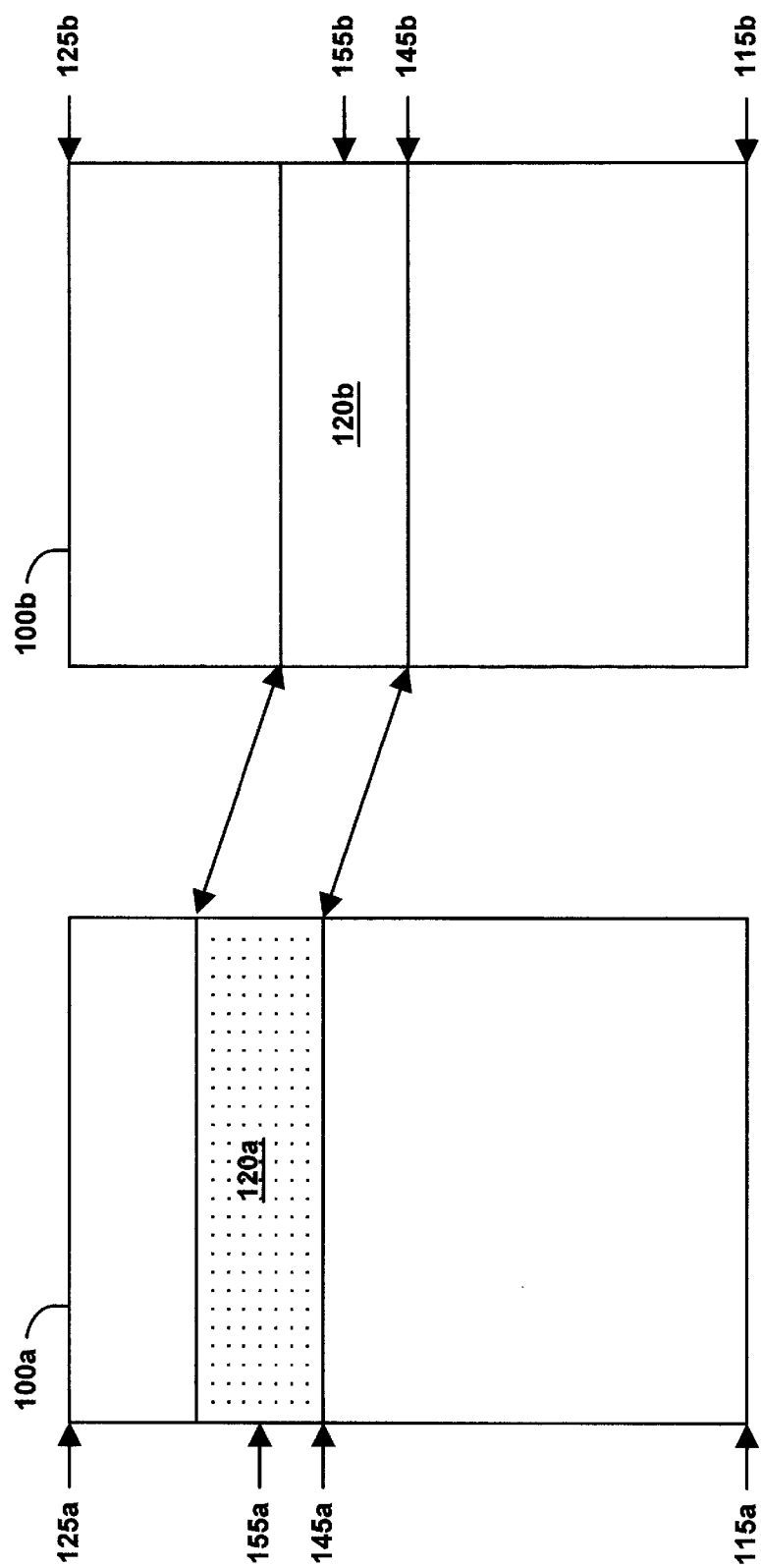
FIG. 1B illustrates exemplary address maps of a source address space and a target address space in accordance with one embodiment of the present invention.

FIG. 1B illustrates exemplary address maps of a source address space and a target address space in accordance with one embodiment of the present invention. Within the scope of the present invention, a source address space and its associated target address space are two separate and distinct sets of memory addresses controlled by independent agents or systems (e.g., different hardware or different operating systems). With reference to FIG. 1B, source address space 100a has a range of addresses from address 115a to address 125a. In particular, source address space 100a encompasses source memory region (SMR) 120a, which starts at base address 145a and includes address 155a. Likewise, target address space 100b has a range of addresses from address 115b to address 125b. In particular, target address space 100b encompasses target memory region (TMR) 120b, which starts at base address 145b and includes address 155b.

Importantly, in accordance with the present invention, source address space 100a and its associated target address space 100b are related in such a way that TMR 120b in target address space 100b is made accessible by the system which controls target address space 100b (target system) to the system which controls source address space 100a (source system), so that the source system can subsequently access addresses within TMR 120b (e.g., address 155b) via direct references to addresses within SMR 120a of source address space 100a (e.g., address 155a) without the need of laborious table lookup, as is typically required in the prior art. More specifically, the source system can reference an address in SMR 120a and quickly generate the corresponding address in TMR 120b using an operation (e.g., an arithmetic or logical operation) which is much more efficient than a table lookup operation. This is achieved by properly selecting SMR 120a and, more particularly, base address 145a in accordance with the present invention as discussed below.

Reserving a Memory Region in Target Address Space

Figure 2:
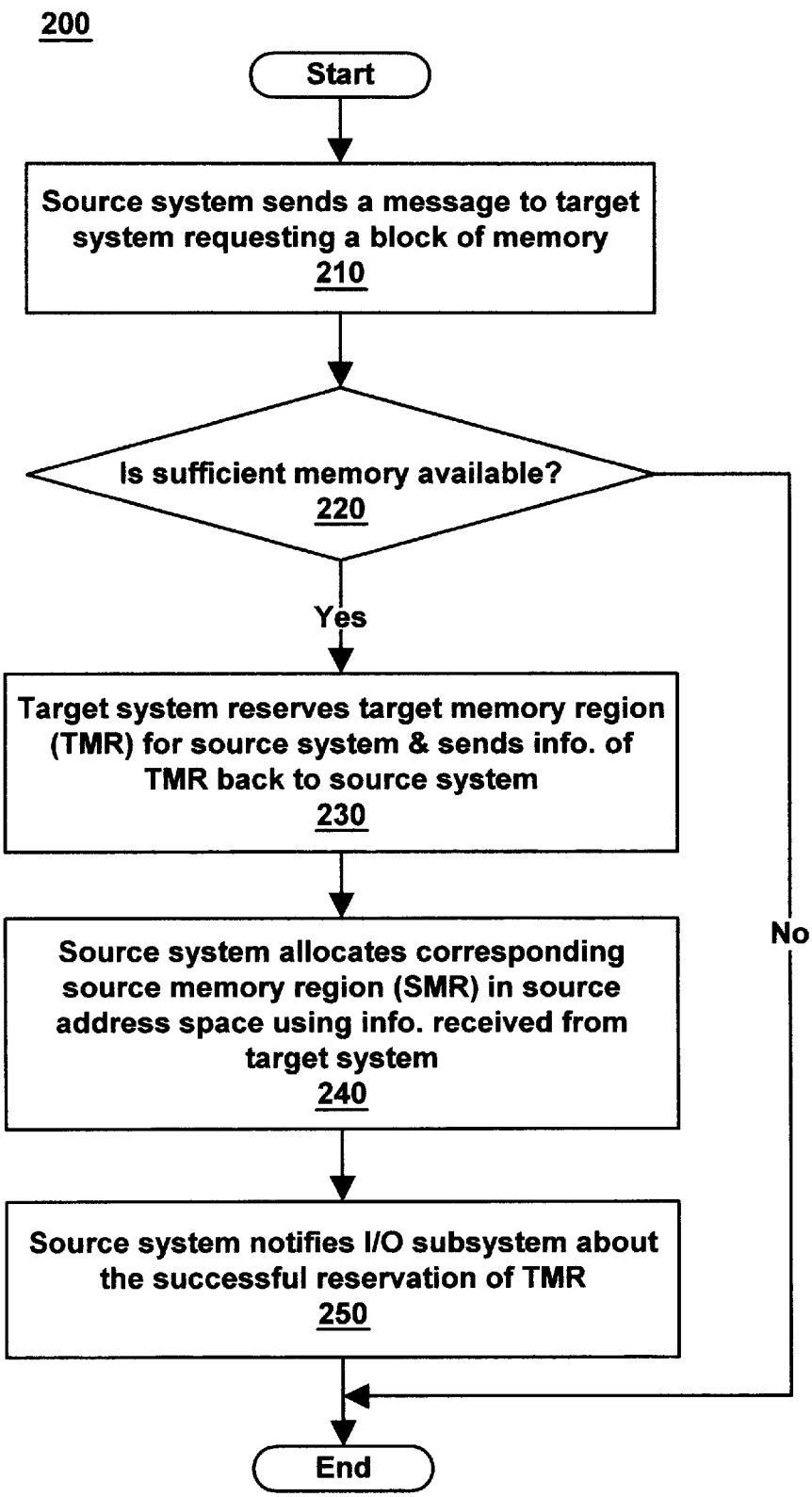
FIG. 2 is a flow diagram illustrating steps used to request a memory region in a target address space for subsequent access via a source address space in accordance with the present invention.

FIG. 2 is a flow diagram 200 illustrating steps used to request a memory region in a target address space for subsequent access via a source address space in accordance with the present invention. With reference to FIG. 2, in step 210, the source system sends a message to the target system requesting that a block of memory in target address space 100b (FIG. 1B) be assigned for access by the source system. In one embodiment, the message sent includes information about the size of the memory block requested.

In step 220, the target system determines whether the request of step 210 can be fulfilled. If insufficient memory is available in the target address space, the request is denied and process 200 terminates. If adequate memory is available, the request is granted and process 200 proceeds to step 230.

In step 230, the target system reserves TMR 120b (FIG. 1B) in target address space 100b and sends a reply message back to the source system to indicate that the request of step 210 is granted. Importantly, in one embodiment, the reply message includes information about TMR 120b in target address space 100b that enables subsequent source system operations to access TMR 120b to be performed efficiently in accordance with the present invention.

In a preferred embodiment, in the reply message, the target system passes back to the source system the virtual address representation (vaddr) of base address 145b of TMR 120b. It is appreciated that this vaddr information of base address 145b enables the source system to efficiently translate addresses within SMR 120a (FIG. 1B) to addresses within TMR 120b, as is described in detail below with respect to FIGS. 5 and 6.

Still referring to FIG. 2, in step 240, the source system allocates SMR 120a in source address space 100a (FIG. 1B) that corresponds to TMR 120b in target address space 100b which has been reserved in step 230. As will be discussed further with respect to FIG. 3 below, SMR 120a is selected based on the information sent by the target system such that subsequent references to addresses in SMR 120a can be efficiently translated to the corresponding addresses in TMR 120b in accordance with the present invention.

In step 250, the source system notifies its input/output (I/O) subsystem that the reservation of TMR 120b is successful, such that subsequent memory access operations can be handled in accordance with the present invention as discussed with respect to FIGS. 5 and 6 below. Process 200 then terminates.

Reserving a Memory Region in Source Address Space

Figure 3:
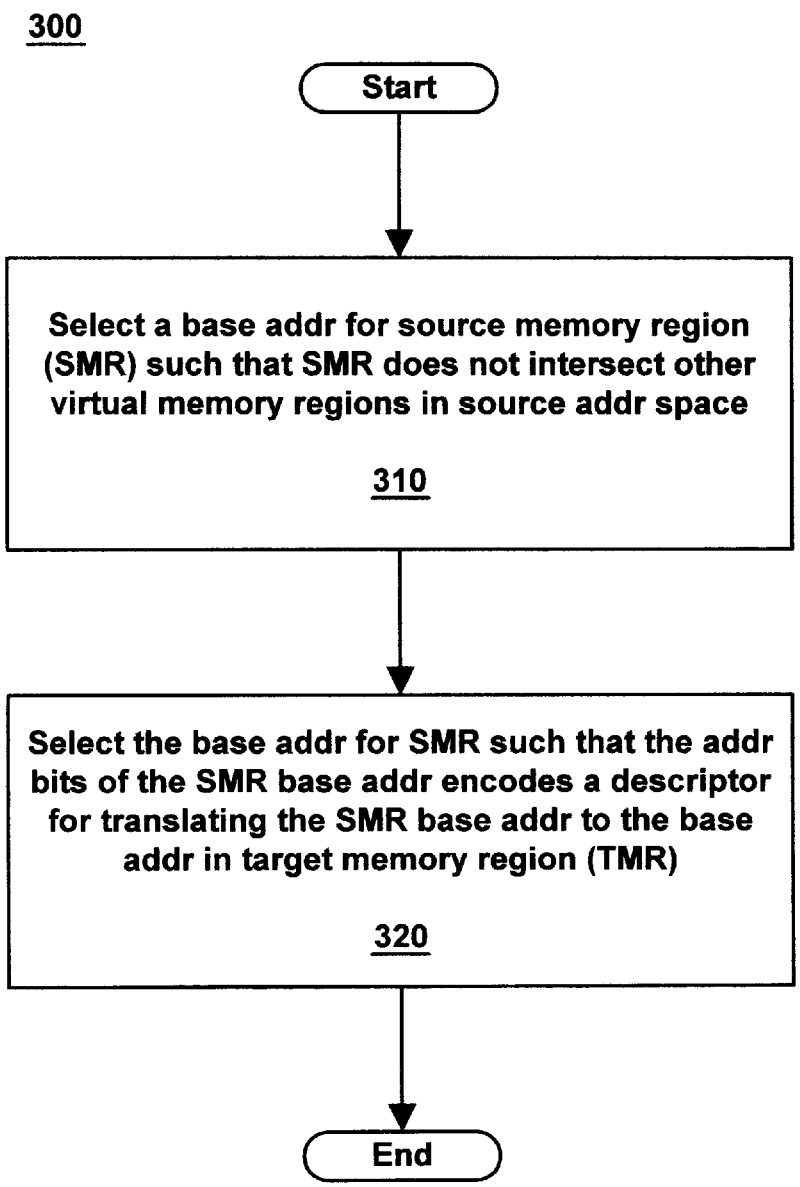
FIG. 3 is a flow diagram illustrating steps used by a source system to allocate a source memory region within the source address space that maps to a target memory region within the target address space of a target system in accordance with the present invention.

Step 240 of process 200 is now discussed in greater detail with reference to FIG. 3. FIG. 3 is a flow diagram 300 illustrating steps used by a source system to allocate a source memory region within the source address space that maps to a target memory region within the target address space of a target system in accordance with the present invention. In one embodiment, since SMR 120a (FIG. 1B) serves to represent TMR 120b (FIG. 1B) within source address space 100a, SMR 120a is selected so that SMR 120a and TMR 120b are equal in size. Once base address 145a (FIG. 1B) of SMR 120a is selected by the source system in accordance with the present invention, there will be a one-to-one correspondence between the addresses within SMR 120a and the addresses within TMR 120b. In particular, base address 145a of SMR 120a will map to base address 145b of TMR 120b. As another example, address 155a of SMR 120a will map to address 155b of TMR 120b.

Referring still to FIG. 3, in step 310, the source system selects base address 145a for SMR 120a such that SMR 120a does not intersect other virtual memory regions within source address space 100a.

It is appreciated that TMR 120b (FIG. 1B) is arbitrarily assigned with respect to SMR 120a. This is because TMR 120b is assigned by the target system and the source system has no control over the exact location of TMR 120b within target address space 100b. However, once the source system has received the notification message from the target system that TMR 120b has been successfully reserved for use by the source system, the source system has complete control over how SMR 120a is allocated within source address space 100a. In one embodiment, source address space 100a is a 64-bit address space, and the source system is able to allocate any available (e.g., unreserved) region to be SMR 120a.

More particularly, in an exemplary embodiment where source address space 100a is a 64-bit virtual address space, a large constant (e.g., a constant of the order of $2^{40}$) is chosen to be base address 145a of SMR 120a. It is appreciated that given the availability of a 64-bit address space, the source system can typically identify an available region within source address space 100a that does not intersect any existing virtual memory regions within source address space 100a. In other words, as long as the source system ensures that its programs utilize the lower portion of source address space 100a, there is typically an abundance of memory in the upper portion of source address space 100a (e.g., the portion of source address space 100a having addresses of $2^{40}$ and higher) where no program code and no program data resides. An appropriately sized region of such unoccupied portion of source address space 100a can then be earmarked as SMR 120a.

Referring still to FIG. 3, in step 320, the source system selects base address 145a for SMR 120a such that the address bits of base address 145a encode a descriptor for translating base address 145a of SMR 120a to the corresponding address in TMR 120b, namely, base address 145b. Within the scope of the present invention, a "descriptor" can be a message or data structure or other means for including information for resolving base address 145b of TMR 120b. Since SMR 120a is contiguous and there exists a one-to-one mapping from SMR 120a to TMR 120b, once base address 145a is so selected, each address within SMR 120a will encode the descriptor for translating that address in SMR 120a to its corresponding address in TMR 120b. For example, once base address 145a of SMR 120a is selected in accordance with the present invention to map to base address 145b of TMR 120b, address 155a of SMR 120a will map to address 155b of TMR 120b by virtue of the one-to-one correspondence that has been established between SMR 120a and TMR 120b.

Figure 4A:
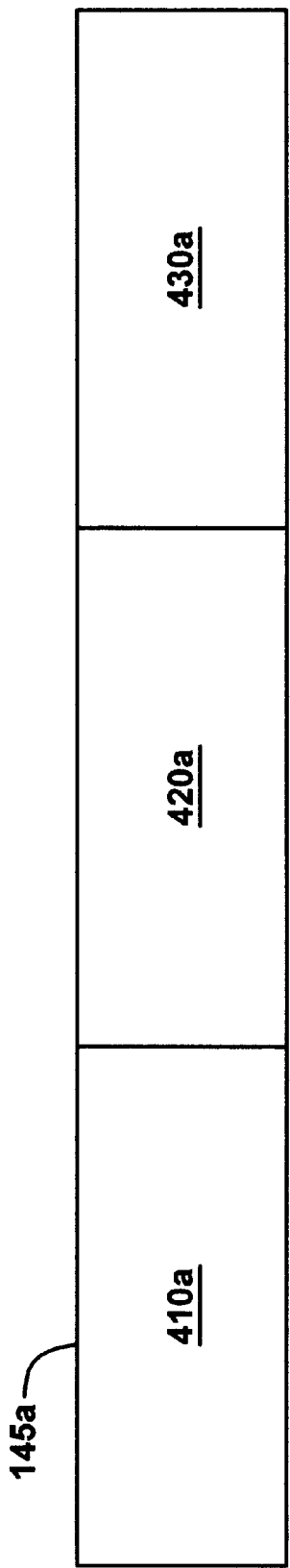
FIG. 4A illustrates an exemplary address in a source memory region in accordance with one embodiment of the present invention.
Figure 4B:
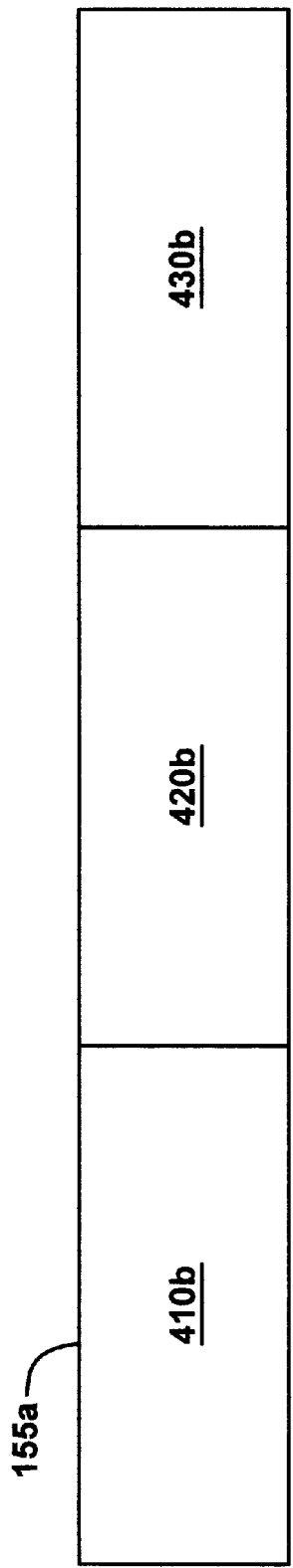
FIG. 4B illustrates another exemplary address in a source memory region in accordance with one embodiment of the present invention.

Importantly, as discussed above with respect to step 230 of FIG. 2, in one embodiment of the present invention, the target system sends back to the source system, as part of the message confirming that TMR 120b has been successfully allocated, information about TMR 120b. More particularly, in one embodiment, the information sent by the target system includes the virtual address representation (vaddr) of base address 145b of TMR 120b. In this embodiment, the source system uses a portion of the address bits of base address 145a of SMR 120a to encode the vaddr of base address 145b of TMR 120b. A representative address in SMR 120a and its constituent parts are illustrated in FIGS. 4A and 4B and discussed in detail below. Upon the completion of step 320, process 300 terminates.

Addresses in Source Memory Region

FIG. 4A illustrates an exemplary address in a source memory region in accordance with one embodiment of the present invention. In FIG. 4A, base address 145a is divided into three bit fields 410a, 420a and 430a. It is appreciated that the width of each of the three bit fields can vary within the scope of the present invention. In one embodiment, the bits represented by field 410a are the highest order bits, the bits represented by field 430a are the lowest order bits, and the bits represented by field 420a are those bits in between fields 410a and 430a.

More specifically, in one embodiment, field 410a serves as an indicator to the source system that base address 145a is not a regular address within source address space 100a (FIG. 1B), but rather an address within SMR 120a (FIG. 1B) which is specifically reserved for accessing an address within TMR 120b (FIG. 1B) in target address space 100b (FIG. 1B). For example, since field 410a occupies the highest order bits in base address 145a, turning on selected bits in field 410a makes base address 145a of a high order of magnitude, such as $2^{40}$. By so doing, SMR 120a, which starts at base address 145a, is advantageously located in the high memory portion of source address space 100a so that SMR 120a does not intersect other virtual memory regions of source address space 100a.

Referring still to FIG. 4A, in one embodiment, field 420a encodes base address 145b of TMR 120b. Recall that in step 230 of FIG. 2, the target system relays back to the source system a descriptor, which in one embodiment includes the vaddr representation of base address 145b of TMR 120b. This vaddr representation of base address 145b is incorporated into base address 145a by selecting the bits of field 420a accordingly. For ease of reference, the bits in field 420a are also referred to as the alias bits of base address 145a.

It is noted that the bits in field 420a would typically represent the "page number" in a regular virtual address. Such would be the case for memory regions in source address space 100a which are regular virtual memory regions. In contrast, within the present invention, for a source memory region in source address space 100a such as SMR 120a, the alias bits of base address 145a would not be a valid page number, but would instead be the vaddr representation of base address 145b of TMR 120b as described above.

It is appreciated that by incorporating base address 145b of TMR 120b in base address 145a of SMR 120a, base address 145b can easily be resolved from base address 145a itself. In particular, in one embodiment, base address 145b can be obtained simply by extracting the bits of field 420a of base address 145a. Importantly, no table lookup or other lengthy computation is required to derive base address 145b from base address 145a, as is typically required in the prior art. In other words, within the scope of the present invention, base address 145b of TMR 120b can be computed from base address 145a of SMR 120a by using a single arithmetic or logical operation instead of by accessing a lookup table or hash table or by using other more complex translation method. Thus, the present invention provides a much more efficient method to translate an address in SMR 120a to the corresponding address in TMR 120b than any of the prior art methods can offer.

With reference still to FIG. 4A, in one embodiment, field 430a of base address 145a represents the offset of base address 145b in TMR 120b. In this particular scenario, the bits of field 430a are set to zero because base address 145b has a zero offset from itself by definition.

It is appreciated that by incorporating the vaddr representation of base address 145b of TMR 120b in base address 145a, the source system needs not know about the underlying physical addresses of TMR 120b in target address space 100b, as is required in the prior art which uses a "handle" to get access to a target memory region. Thus, the present invention advantageously preserves the protection model offered by the virtual memory layer of target address space 100b. More importantly, knowing the vaddr representation of base address 145b of TMR 120b enables the source system to directly interpret and resolve addresses and references to addresses in TMR 120b (e.g., addresses and pointers to addresses in TMR 120b that are generated by the target system and sent to the source system via data messages) that would otherwise only be meaningful to the target system but not to the source system. This is discussed in further detail with respect to FIGS. 5 and 6 below.

Referring next to FIG. 4B, another exemplary address in a source memory region in accordance with one embodiment of the present invention is illustrated. In FIG. 4B, address 155a is divided into three bit fields 410b, 420b and 430b, just as base address 145a is divided into three bit fields 410a, 420a and 430a in FIG. 4A.

It is appreciated that fields 410b, 420b and 430b serve the same function as fields 410a, 420a and 430a, respectively. Thus, in one embodiment, field 410b serves as an indicator to the source system that address 155a is not a regular address within source address space 100a (FIG. 1B), but rather an address within SMR 120a (FIG. 1B) which is specifically reserved for accessing an address within TMR 120b (FIG. 1B) in target address space 100b (FIG. 1B).

Referring still to FIG. 4B, in one embodiment, field 420b encodes base address 145b of TMR 120b, just as field 420a (FIG. 4A) does. Again, the vaddr representation of base address 145b is incorporated into address 155a by selecting the bits of field 420b accordingly. For ease of reference, the bits in field 420b are also referred to as the alias bits of address 155a.

It is appreciated that by incorporating base address 145b of TMR 120b in address 155a of SMR 120a, address 155b of TMR 120b can easily be resolved from address 155a of SMR 120a. In particular, in one embodiment, base address 145b can be obtained simply by extracting the bits of field 420b of address 155a. In other words, within the scope of the present invention, base address 145b of TMR 120b can be computed from address 155a of SMR 120a by using a single arithmetic or logical operation instead of by accessing a lookup table or hash table or by using other more complex translation method. Once again, no table lookup or other lengthy computation is required to derive base address 145b from address 155a.

With reference still to FIG. 4B, in one embodiment, field 430a of address 155a represents the offset of address 155b in TMR 120b. In this particular scenario, the bits of field 430a are set to indicate the offset of address 155b from base address 145b in TMR 120b.

It is appreciated that within the scope of the present invention, SMR 120a and TMR 120b can either be in the same address space or in different address spaces. Thus, source address space 100a and target address space 100b can be one and the same, so that SMR 120a and TMR 120b are local (e.g., in the same host) to, though separate from, each other. Source address space 100a and target address space 100b can also be located remotely from each other (e.g., in different hosts), so that SMR 120a and TMR 120b are likewise remote with respect to each other. Moreover, TMR 100b can either be a physical address space or a synthetic (e.g., virtual) address space. Thus, the method of the present invention can be used to map local addresses to a local physical or synthetic address space as well as remote addresses.

Further, it is noted that the present invention supports access to multiple target address spaces. Thus, in one embodiment, multiple SMRs are set up within source address space 100a to facilitate direct access by the source system to multiple TMRs, which can be within one or more target address spaces such as TMR 100b. In this embodiment, the alias bits of an address within a given SMR would encode the base address of the appropriate TMR, thus each SMR-TMR mapping would function independently.

Accessing Target Memory Region via Source Memory Region

Figure 5:
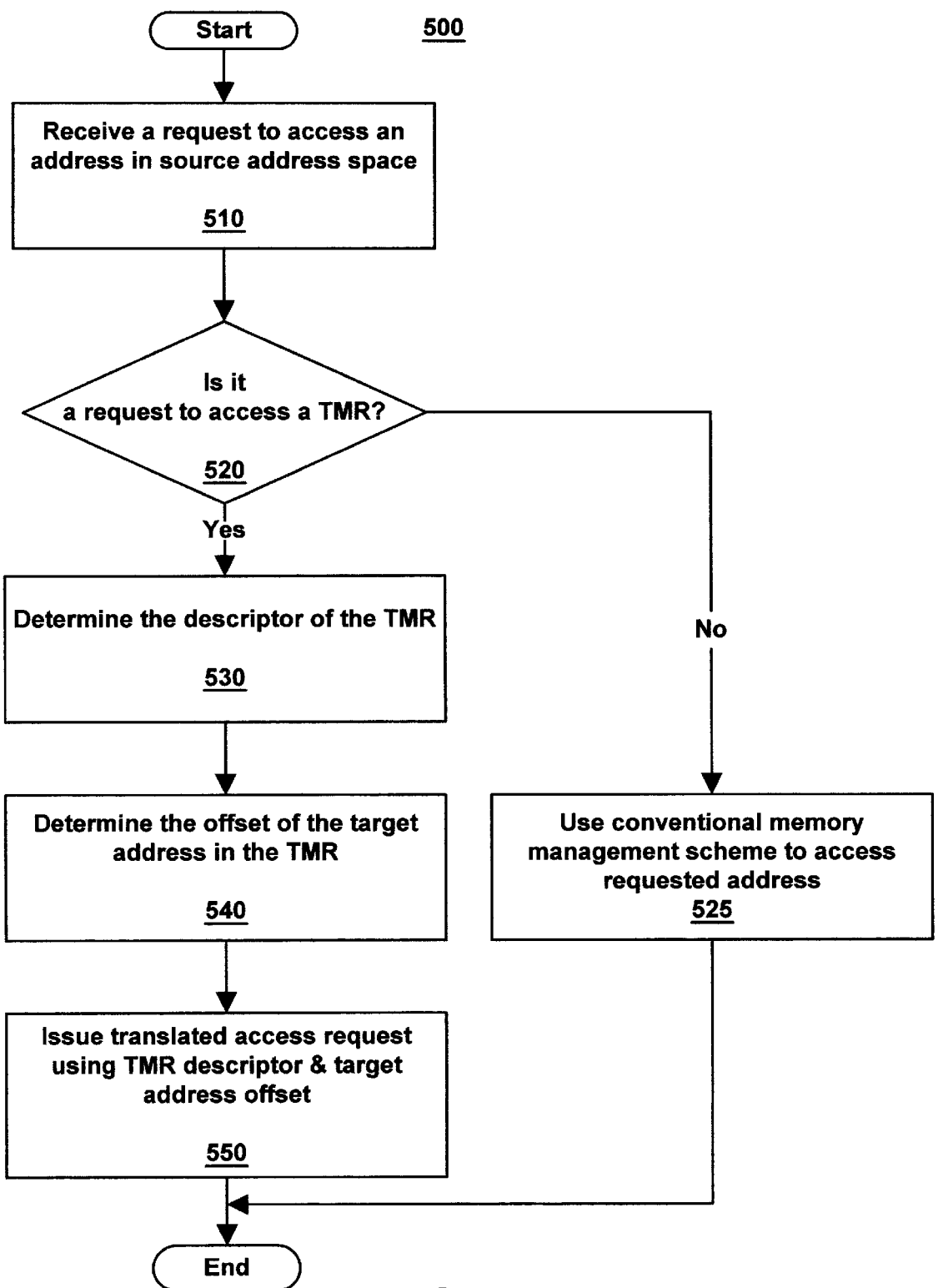
FIG. 5 is a flow diagram illustrating steps used by a source system to access an address in a target memory region via a source memory region in accordance with the present invention.

FIG. 5 is a flow diagram 500 illustrating steps used by a source system to access an address in a target memory region via a source memory region in accordance with the present invention. Referring to FIG. 5, in step 510, in one embodiment, the I/O subsystem of the source system receives a request to access an address of source address space 100a. It is noted that although the address presented is within source address space 100a, the address could be either inside or outside of a source memory region which is reserved for accessing a corresponding target memory region.

Thus, referring still to FIG. 5, in step 520, in one embodiment, the I/O subsystem of the source system determines whether or not access to a target memory region (e.g., TMR 120b) is being requested. It is noted that if the address presented falls within a source memory region, then access to the corresponding target memory region is needed. Thus, if an address within a source memory region (e.g., addresses 145a and 155a of SMR 120a) is presented, process 500 proceeds to step 530; otherwise, process 500 proceeds to step 525, wherein the I/O subsystem uses a conventional memory management scheme, such as paging, to access the requested memory address. As discussed above, in one embodiment, an examination of the higher order bits of the address (e.g., field 410a of address 145a and field 410b of address 155a in FIGS. 4A and 4B) would reveal whether the address presented is within a source memory region or not. In one embodiment, a designated large constant (e.g., $2^{40}$) stored in the higher order bits of the address presented indicates that the address is not a regular address within source address space 100a, but is an address within a source memory region of source address space 100a, such that translation is necessary.

Once it is determined that the address refers to a target memory region, in step 530, in one embodiment, the I/O subsystem of the source system determines the descriptor of the target memory region to which the address refers. As discussed above with respect to FIGS. 4A and 4B, the alias bits of the address (e.g., field 420a of address 145a and field 420b of address 155a) encodes the descriptor of the appropriate target memory region.

With reference still to FIG. 5, in step 540, in one embodiment, the I/O subsystem of the source system determines the offset of the corresponding address in the target memory region. As discussed above with respect to FIGS. 4A and 4B, the lower order bits of the address (e.g., field 430a of address 145a and field 430b of address 155a) encodes the offset of the address in the target memory region.

In step 550, in one embodiment, the I/O subsystem of the source system issues a translated access request using the descriptor of the target memory region and the offset of the target address. The translated request is sent over to the target system and serviced. Process 500 then terminates.

Hence, in one embodiment wherein the alias bits constitute the vaddr representation of the base address of the target memory region and the lower order bits constitute the offset of the target address in the target memory region, the target address can be computed simply by subtracting the large constant stored in the higher order bits of the address from the address itself. As such, no inefficient table lookup is required to translate the source address to the target address. Thus, the method of the present invention affords superior performance in address translation over the prior art methods.

Resolving Address Pointers of Target Memory Region

Figure 6:
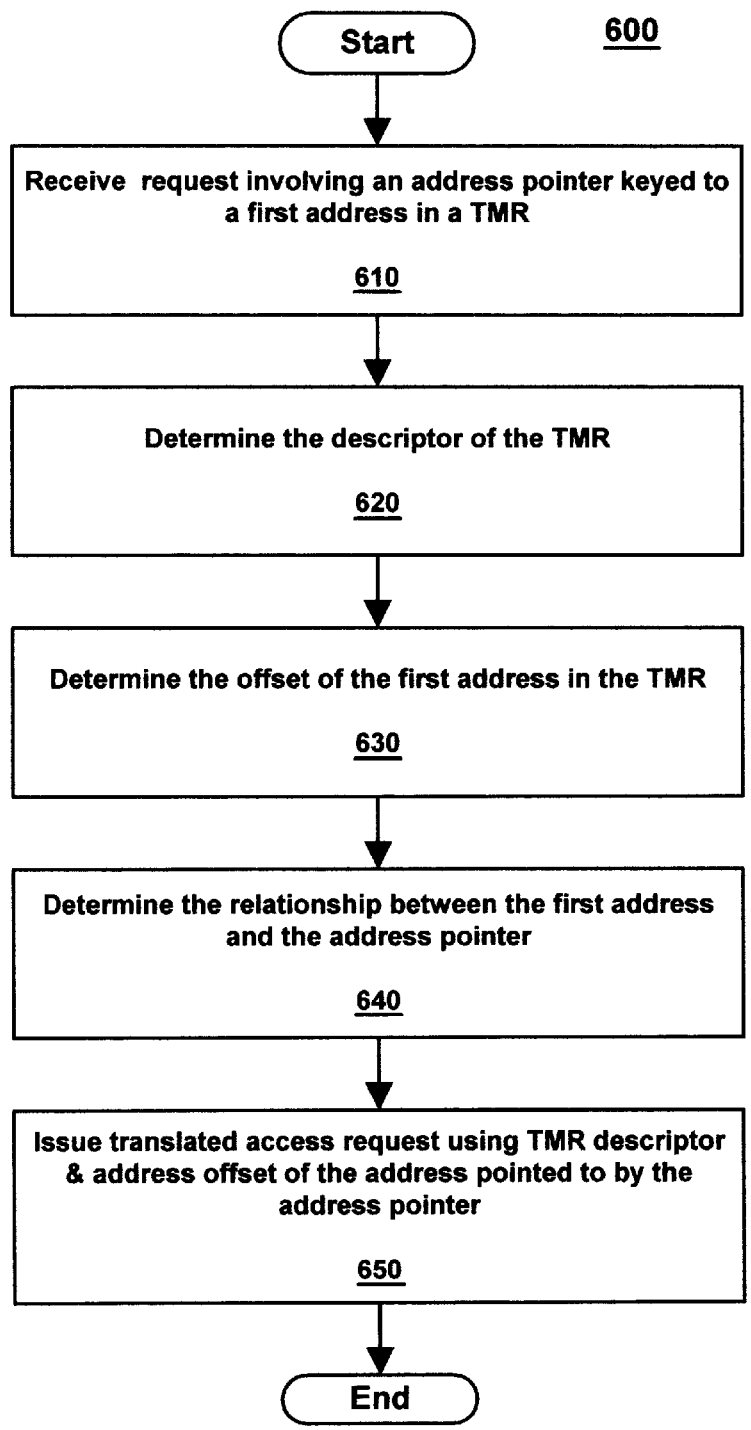
FIG. 6 is a flow diagram illustrating steps used by a source system to resolve an address pointer in a target memory region in accordance with the present invention.

FIG. 6 is a flow diagram 600 illustrating steps used by a source system to resolve an address pointer in a target memory region in accordance with the present invention. Referring to FIG. 6, in step 610, in one embodiment, the I/O subsystem of the source system receives a request involving an address pointer keyed to a first address in a target memory region. This scenario is typically encountered when the source system has already retrieved or otherwise received certain data from the target system, and the data contains an address pointer in the target memory region. An example is a pointer from one element of a linked list (located at a first address) to the next element of the linked list (located at a second address which is at a certain distance from the first address). In this situation, the address pointer is generated by the target system and is expressed with respect to the target memory region (e.g., pointing from the first address to the second address) and not with respect to source address space 100a which the source system controls (unless the target memory region also resides in source address space 100a). Therefore, the source system needs to resolve the first address, and then the address pointer therefrom, before the request can be serviced.

Referring still to FIG. 6, in step 620, in one embodiment, the I/O subsystem of the source system determines the descriptor of the target memory region in which the first address resides. This information can be obtained directly from the first address itself.

With reference still to FIG. 6, in step 630, in one embodiment, the I/O subsystem of the source system determines the offset of the first address in the target memory region. Again, this information can be obtained directly from the first address itself.

In step 640, in one embodiment, the I/O subsystem of the source system determines the relationship between the first address and the address pointer. For example, if the first address contains one element of a linked list of characters, and the address pointer points to the next element of the linked list, then the distance between the address of the first element (the first address) and the address of the next element (the second address) equals the size of one character in the target system. In other words, the offset of the address pointed to by the address pointer (the second address) is the sum of the offset of the first address and the size of one character when measured from the base address of the target memory region. The address pointed to by the address pointer is thus resolved.

Still referring to FIG. 6, in step 650, in one embodiment, the I/O subsystem of the source system issues a translated access request using the descriptor of the target memory region and the offset of the address pointed to by the address pointer. The translated request is sent over to the target system and serviced. Process 600 then terminates.

Additional Embodiments

In the exemplary embodiments of the present invention as described above, address translations are performed by the I/O subsystem of the source system in which one or more source memory regions reside. However, these exemplary implementations are for illustrative purposes only, and can be modified within the spirit of the present invention. In particular, it is noted that the present invention can be conveniently implemented using either software or hardware or both. It is appreciated that one of ordinary skill in the art could readily implement the software and/or hardware required to realize the present invention based on its description herein without adhering strictly to the exemplary embodiments described above.

Furthermore, it is appreciated that various programming models can be used within the scope of the present invention. For example, in the context of remote DMA programming, one implementation is to allow the source system to send 'get' requests directly to the remote target system for retrieving data within the target memory region. This is possible because the present invention enables the source system to directly translate virtual addresses of the target memory region (and references to those addresses, such as pointers to those addresses) without further information from the target system, as described in detail above, so that the memory access requests (e.g., 'get' requests) can be sent with the properly translated address already intacted.

Another RDMA implementation allows programmers to freely use remote addresses as if those addresses are local. Thus, in this programming model, an assignment such as:

x=*r_addr;

where x is a variable within the source address space and r_addr is a pointer to an address in a target memory region in the remote target system (and thus *r_addr is the data pointed to by r_addr), is valid in a program running on the source system. The source system automatically identifies any remote address and performs the necessary translation. This implementation thus relieves the programmers from having to explicitly code for remote address translations, thereby offering another novel advantage over prior art implementations of RDMA systems.

Based on the discussion of the present invention herein, a person of ordinary skill in the art could readily implement the hardware and/or software required for the desired programming model, including but not limited to the exemplary implementations described above, and to realize the benefits of the present invention.

The preferred embodiment of the present invention, a method and system for efficient performance of memory address translations, is thus described. While the present invention has been described in particular embodiments, it should be appreciated that the present invention should not be construed as limited by such embodiments, but rather construed according to the below claims.

What is claimed is:

1. A computer implemented method for performing memory address translations in a computer system, said method comprising the steps of:
   a) reserving a target memory region (TMR) in a target address space, said TMR having a target base address;
   b) reserving a source memory region (SMR) in a source address space, said SMR having a source base address;
   c) generating a descriptor including information for resolving said target base address of said TMR; and
   d) representing said TMR with said SMR in said source address space, said source base address being selected based on said descriptor such that said target base address can be computed from said source base address without using a lookup table.

2. The computer implemented method as recited in claim 1 wherein said descriptor includes a virtual address representation of said target base address.

3. The computer implemented method as recited in claim 1 wherein said source base address encodes a virtual address representation of said target base address.

4. The computer implemented method as recited in claim 1 wherein said TMR includes a target address having an offset from said target base address, said SMR includes a source address representing said target address, and said source address encodes said offset of said target address such that said target address can be computed from said source address without using a lookup table.

5. The computer implemented method as recited in claim 4 further comprising the steps of:
   e) receiving a request to access said target address while operating in a context of said source address space; and
   f) servicing said request to access said target address without using a lookup table.

6. The computer implemented method as recited in claim 5 wherein said step h) comprises the steps of:

f1) identifying said target address as residing outside of said source address space; and f2) resolving said target address of said target address space using said source address of said source address space.

7. The computer implemented method as recited in claim 1 wherein said source memory region does not intersect other virtual memory regions of said source address space.

8. The computer implemented method as recited in claim 1 wherein said source address space is a 64-bit address space.

9. The computer implemented method as recited in claim 1 wherein no program code and no program data resides in memory locations of said source address space beyond said source base address.

10. The computer implemented method as recited in claim 1 wherein said target memory region comprises a plurality of target memory regions and said source memory region comprises a plurality of source memory regions, such that each of said plurality of target memory regions is represented by a unique one of said plurality of source memory regions.

11. The computer implemented method as recited in claim 1 wherein said source address space and said target address space reside in different host computers.

12. A computer system comprising:
   a processor;
   an address/data bus coupled to said processor;
   a computer readable memory coupled to communicate with said processor, said processor for performing a method for performing memory address translations in said computer system, said method comprising the steps of:
      a) reserving a target memory region (TMR) in a target address space, said TMR having a target base address;
      b) reserving a source memory region (SMR) in a source address space, said SMR having a source base address;
      c) generating a descriptor including information for resolving said target base address of said TMR; and
      d) representing said TMR with said SMR in said source address space, said source base address being selected based on said descriptor such that said target base address can be computed from said source base address without using a lookup table.

13. The computer system as recited in claim 12 wherein said descriptor includes a virtual address representation of said target base address.

14. The computer system as recited in claim 12 wherein said source base address encodes a virtual address representation of said target base address.

15. The computer system as recited in claim 12 wherein said TMR includes a target address having an offset from said target base address, said SMR includes a source address representing said target address, and said source address encodes said offset of said target address such that said target address can be computed from said source address without using a lookup table.

16. The computer system as recited in claim 15 further comprising the steps of:
   e) receiving a request to access said target address while operating in a context of said source address space; and
   f) servicing said request to access said target address without using a lookup table.

17. The computer system as recited in claim 16 wherein said step h) comprises the steps of:

f1) identifying said target address as residing outside of said source address space; and f2) resolving said target address of said target address space using said source address of said source address space.

18. The computer system as recited in claim 12 wherein said source memory region does not intersect other virtual memory regions of said source address space.

19. The computer system as recited in claim 12 wherein said source address space is a 64-bit address space.

20. The computer system as recited in claim 12 wherein no program code and no program data resides in memory locations of said source address space beyond said source base address.

21. The computer system as recited in claim 12 wherein said target memory region comprises a plurality of target memory regions and said source memory region comprises a plurality of source memory regions, such that each of said plurality of target memory regions is represented by a unique one of said plurality of source memory regions.

22. The computer system as recited in claim 12 wherein said source address space and said target address space reside in different host computers.

23. A computer-usable medium having computer-readable program code embodied therein for causing a computer system to perform the steps of:
   a) reserving a target memory region (TMR) in a target address space, said TMR having a target base address;
   b) reserving a source memory region (SMR) in a source address space, said SMR having a source base address;
   c) generating a descriptor including information for resolving said target base address of said TMR; and
   d) representing said TMR with said SMR in said source address space, said source base address being selected based on said descriptor such that said target base address can be computed from said source base address without using a lookup table.

24. The computer-usable medium as recited in claim 23 wherein said descriptor includes a virtual address representation of said target base address.

25. The computer-usable medium as recited in claim 23 wherein said source base address encodes a virtual address representation of said target base address.

26. The computer-usable medium as recited in claim 23 wherein said TMR includes a target address having an offset from said target base address, said SMR includes a source address representing said target address, and said source address encodes said offset of said target address such that said target address can be computed from said source address without using a lookup table.

27. The computer-usable medium as recited in claim 26 further comprising the steps of:
   e) receiving a request to access said target address while operating in a context of said source address space; and
   f) servicing said request to access said target address without using a lookup table.

28. The computer-usable medium as recited in claim 27 wherein said step h) comprises the steps of:
   f1) identifying said target address as residing outside of said source address space; and
   f2) resolving said target address of said target address space using said source address of said source address space.

29. The computer-usable medium as recited in claim 23 wherein said source memory region does not intersect other virtual memory regions of said source address space.

30. The computer-usable medium as recited in claim 23 wherein said source address space is a 64-bit address space.

31. The computer-usable medium as recited in claim 23 wherein no program code and no program data resides in memory locations of said source address space beyond said source base address.

32. The computer-usable medium as recited in claim 23 wherein said target memory region comprises a plurality of target memory regions and said source memory region comprises a plurality of source memory regions, such that each of said plurality of target memory regions is represented by a unique one of said plurality of source memory regions.

33. The computer-usable medium as recited in claim 23 wherein said source address space and said target address space reside in different host computers.

* * * * *